Aug. 1, 1944.   O. HAAS ET AL   2,354,810
SECURING WIRE INSERTS IN TAPPED HOLES
Filed June 24, 1942
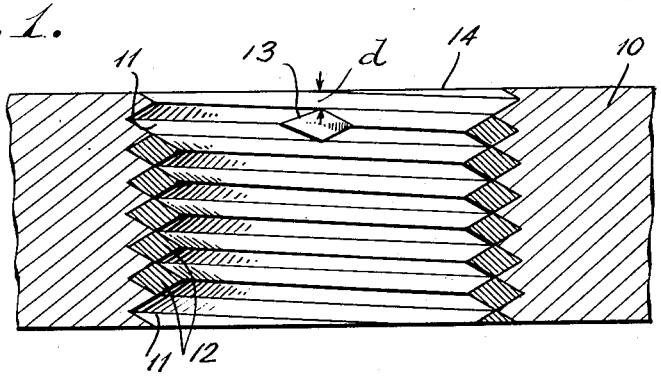
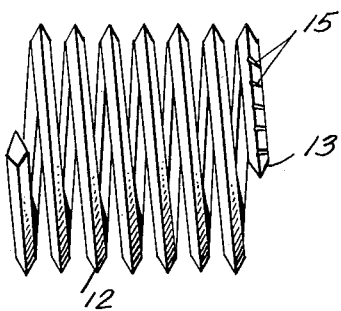
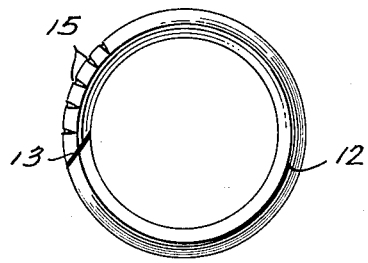
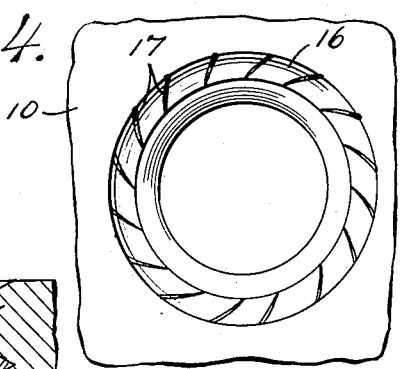
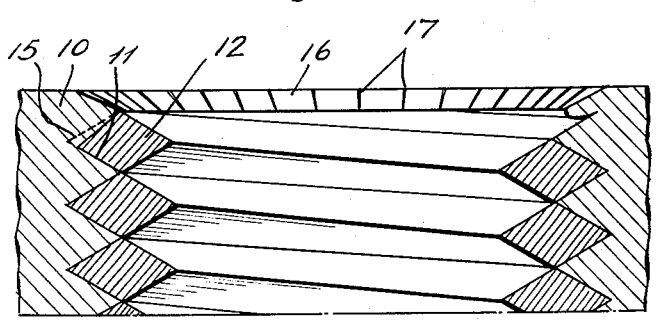
INVENTORS
OTTO HAAS
JAMES RICHARD HAWKINS
BY Walter S. Alerton
ATTORNEY Patented Aug. 1, 1944

2,354,810

UNITED STATES PATENT OFFICE 2,354,810

SECURING WIRE INSERTS IN TAPPED HOLES

Otto Haas, Richmond Hill, and James Richard Hawkins, Flushing, N. Y., assignors to Aircraft Screw Products Company, Inc., Long Island City, N. Y., a corporation of New York Application June 24, 1942, Serial No. 448,255

3 Claims. (Cl. 29—148)

The invention relates to a screw connection in which the boss or nut member of the connection is lined with a wire coil insert applied for instance in order to safeguard the threading of a boss or nut of soft material against the deteriorating effect of the repeated screwing in and out of a hard metal bolt or stud member. Such connections are described, e. g., in U. S. Patent No. 2,150,875 to Caminez. The cross-section of the insert wire and of the threading of the boss and of the bolt can be so designed that the friction between the lining and the threading of the boss, owing to the elastic force of the insert and/or other radial forces, is greater at any time than that between the lining and the bolt whereby any undesired movement of the lining relatively to the boss will be prevented. However, it is not always possible to use a wire of a cross-section of the mentioned type. In such an event, measures must be taken safely to secure the lining in position, whereas with cross-sections of the first mentioned type such measures may be applied for sake of additional safety.

Although various means and methods have been suggested for the indicated purpose, we have not found any of them satisfactory for various reasons.

The invention aims, therefore, to provide a method easily applicable whereby the wire lining in the tapped hole of a boss member or nut can be secured in position against the practically occurring forces tending to dislocate it.

The invention consists of a method whereby the wire coil lining and the threading of the boss or nut are partially deformed without injury to that part of the wire coil which is intended to constitute the threading to be engaged by a bolt or stud.

The invention also consists of a combination of a bolt or nut member with a wire coil lining wherein part of that portion of the wire which is in engagement with the boss or nut member threading, and a corresponding portion of the threading of said member are deformed.

Further objects and details of the invention will be apparent from the description given hereinafter and the accompanying drawing showing an embodiment thereof by way of example. In the drawing—

Fig. 1 is a cross-section of a boss member with lining before the latter has been secured according to the invention.

Figs. 2 and 3 are side elevation and front views respectively of the lining prior to its insertion.

Fig. 4 is a top view of the boss-member of Figure 1, with the lining secured therein and Fig. 5 is an enlarged cross-section of a portion of the boss threading and its lining in the state of Fig. 4.

Referring now to the drawing. The boss member or nut 10 is provided with a conventional V-threading 11 which may be produced by tapping or any other suitable means. Into the threading, a wire coil 12 has been screwed which in the illustrated embodiment has a diamond shaped cross-section. However, it is to be understood that the invention is applicable with equal result to wire coils and thread shapes of other cross-sections. It will be noticed that the wire coil is screwed in far enough to position the end 13 of the wire a short distance $d$ below the upper rim 14 of the member 10.

Now, in order to secure the wire coil lining 12 in the threading 11, we stake the upper rim 14 of member 10 down on that portion of the topmost coil convolution which is embedded in the threading 11. This staking is applied in a ring zone about the axis of the tapped hole and with an inner diameter substantially equal to the inner, i. e., the smallest diameter of the threading 11. In so doing care is taken that that portion of the wire is not affected which projects from the threading 11 inward, i. e., towards the axis of the thread helix, and which is intended to constitute the female threading for a bolt or stud (not shown). Simultaneously with the staking operation, radial pressure is to be applied by any suitable means to the convolutions of the wire coil, in order to force them into close contact with the threading and to prevent the coil from being urged inward under the action of a component of the staking force. The staking causes a compression of the upper end of the coil and of the convolution in which it engages, thereby increasing the coefficient of friction between the two parts. In addition thereto the topmost portion of the threading which is not engaged by the coil will be so deformed as to prevent the coil from being screwed out of the tapped hole. The effect of the staking can still be increased if the top convolution of the coil is provided with a number of notches 15 as shown in Figs. 3 and 4. Such notches should be applied, however in the upper face of that portion only which is embedded in the threading 11 in order to leave unimpaired the surfaces intended to engage the threading of a bolt or stud. The staking operation will force the material of the member 10 into the notches 15, thereby increasing the resistance against a movement of the inserted coil relatively to the member 10. Furthermore, we found it convenient to accomplish the staking in such a manner that the top rim of the tapped hole apears flared like countersunk, as indicated at 16. Also, the material of the rim may be locally densified by notches 17 produced in the staking operation.

It will be clear that, in suitable cases, the method hereinbefore described may be applied to both ends of a tapped hole lined with a wire coil insert, and it is to be understood that the term "topmost" is used in this specification and the appended claims to indicate the direction rather in which the insert is to be secured against unscrewing, than a position with respect to the vertical in space.

It is characteristic of the finished article, i. e., of a member having a tapped hole provided with a lining secured to the member according to the invention, that the end 13 of the wire coil 12 is located a short distance below the upper surface of the member 10 in which the threading 11 is tapped, and that the portion of the threading between the coil end 13 and the top surface of the member forming the rim 14 is deformed by staking which simultaneously densifies the material in the stacked zone. In the preferred form the portion 16 is flared or countersunk by such staking. This is not only advantageous from a view point of a smooth job but also because the flaring facilitates the inserting of a screw bolt or stud into the threading constituted by the wire coil. As stated above, the wire coil for the purpose here in consideration may be provided, prior to its insertion with notches 15. These notches, however, should be applied only in a portion of that surface of an end convolution, which is to be embedded in the threading of the tapped hole. In other words, the inner portion of the wire which is to be engaged by the bolt or stud should not be notched in order to avoid any impairment of the thread convolutions constituted by the wire coil. Otherwise, the notches or indentations 15 may have any suitable form and configuration.

It will be apparent to those skilled in the art that many alterations and modifications of the method and combination described and illustrated by way of example are possible within the spirit of my invention which shall be limited therefore only by the scope of the patented claims.

We claim:

1. The combination of a member provided with an interiorly screw-threaded hole, with a wire coil insert therein, the top end of said coil being a short distance below the surface of said member in which said hole is provided, a portion of the topmost convolution of said coil being provided with a plurality of notches in its upper surface portion which is in engagement with the threading of said hole, and the convolution of the threading of the hole above said insert being bent downward and material thereof being pressed into engagement with said notches.

2. A method of securing a wire coil insert in the screw threading of a boss or nut member, comprising the steps of coiling the wire with a diameter originally slightly larger than the corresponding diameter of the threading for which it is destined, notching one end convolution of the coil in the outer portion of its end face inserting the coil with said end convolution trailing into said threading so that said end convolution is at some distance below the surface of the member in which said threading is provided, expanding said coil by applying pressure in radial direction, and then in a staking operation in which the staking force is applied in an axial direction to a ring zone of the surface of said member with the axis of the threading as a center and with an inner diameter substantially equal to the inner diameter of said threading, simultaneously compressing the material of said member in contact with said end convolutions of the said coil, and in the same operation, deforming the portion of the threading between said surface of said member and said end convolution and forcing material of said member into said notches while maintaining the expanding pressure.

3. A method of securing a wire coil insert in the interior screw threading of a boss or nut member, comprising the steps of coiling the wire with a diameter originally slightly larger than the corresponding diameter of the threading for which its is destined, inserting the coil with said end convolution trailing into the threading so that said end convolution is at some distance below the surface of the member in which said threading is provided, expanding said coil from its interior by applying pressure in radial direction, and then, in a staking operation in which the staking force is applied in an axial direction to a ring zone of said surface with the axis of the threading as a center and with an inner diameter substantially equal to the inner diameter of the threading, simultaneously compressing the material of said member in contact with said end convolution of said coil and in the same operation deforming the portion of the threading between said surface and said end convolution while maintaining the expanding pressure.

OTTO HAAS.
JAMES RICHARD HAWKINS.